US012149907B2

(12) United States Patent
Yang et al.

(10) Patent No.: US 12,149,907 B2
(45) Date of Patent: Nov. 19, 2024

(54) SOUND-PRODUCING DEVICE AND ELECTRONIC TERMINAL

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 235 days.

(21) Appl. No.: 17/773,167

(22) PCT Filed: Nov. 5, 2020

(86) PCT No.: PCT/CN2020/126815
§ 371 (c)(1),
(2) Date: Apr. 29, 2022

(87) PCT Pub. No.: WO2021/088931
PCT Pub. Date: May 14, 2021

(65) Prior Publication Data

US 2024/0155294 A1 May 9, 2024

(30) Foreign Application Priority Data

Nov. 8, 2019 (CN) ........................ 201911090401.X

(51) Int. Cl.
*H04R 9/02* (2006.01)
*H04R 9/06* (2006.01)

(52) U.S. Cl.
CPC ............... *H04R 9/025* (2013.01); *H04R 9/06* (2013.01)

(58) Field of Classification Search
CPC ...... H04R 2307/201; H04R 9/02; H04R 9/06; H04R 2400/11; H04R 9/043; H04R 9/025;
(Continued)

(56) References Cited

U.S. PATENT DOCUMENTS 7,515,727 B2 * 4/2009 Watanabe ............ H04R 31/006 381/409
2004/0001603 A1 * 1/2004 Sahyoun .................. H04R 1/06 381/407
(Continued)

FOREIGN PATENT DOCUMENTS

CN 109951771 A 6/2019

*Primary Examiner* — Carolyn R Edwards
*Assistant Examiner* — Julie X Dang
(74) *Attorney, Agent, or Firm* — Baker Botts LLP

(57) ABSTRACT

Disclosed are a sound-producing device and an electronic terminal. The sound-producing device comprises: a voice coil, the voice coil including a bobbin and a voice coil body wound outside the bobbin; the voice coil is configured to be able to be input an electrical signal; a first damper group and a second damper group, each of the first damper group and the second damper group comprising a first connecting part connected with the voice coil, a second connecting part fixed to the sound-producing device and an elastic part connected between the first connecting part and the second connecting part; the first damper group is configured to be in electrical communication with the voice coil to input the electrical signal to the voice coil; the first damper group and the second damper group are fixed to the voice coil in parallel at different heights.

16 Claims, 2 Drawing Sheets

(58) Field of Classification Search
CPC . H04R 9/045; H04R 1/06; H04R 7/04; H04R 7/26; H04R 7/127; H04R 31/006; H04R 9/066; H04R 7/16
USPC ....... 381/400, 401, 403, 423, 398, 162, 386; 181/173, 170, 171
See application file for complete search history.

(56) References Cited

U.S. PATENT DOCUMENTS

| | | | | |
|---|---|---|---|---|
| 2004/0161124 A1* | 8/2004 | Otomo | H04R 7/16 | 381/162 |
| 2004/0197007 A1* | 10/2004 | Onuma | H04R 31/00 | 381/396 |
| 2005/0147272 A1* | 7/2005 | Hyre | H04R 9/06 | 381/404 |
| 2006/0280330 A1* | 12/2006 | Watanabe | H04R 9/022 | 381/397 |
| 2011/0116678 A1* | 5/2011 | Wang | H04R 9/043 | 381/407 |
| 2011/0305361 A1* | 12/2011 | Li | C22C 49/04 | 977/932 |
| 2012/0106777 A1* | 5/2012 | Fujimoto | H04R 9/043 | 181/166 |
| 2020/0399446 A1* | 12/2020 | An | C08K 5/005 | |

* cited by examiner

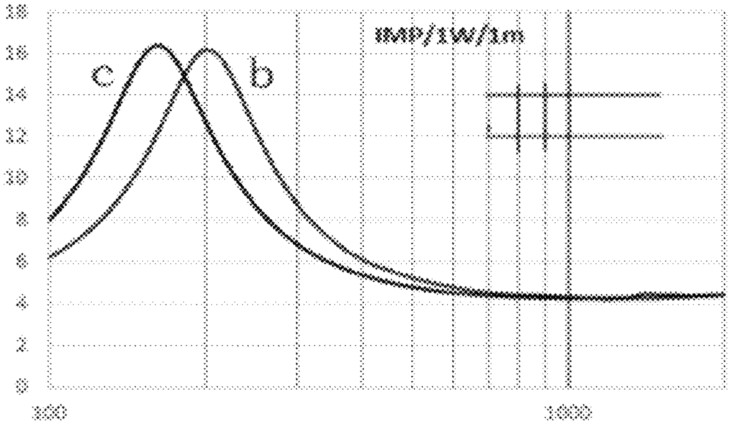

Impedance Curve Diagram of Sound-producing Devices b: A Sound-producing Device Installed with a Prior Art Damper: Resonant Frequency F0 =195Hz
c: A Sound-producing Device Installed with the Damper of the Present Disclosure: Resonant Frequency F0=170Hz

FIG. 3

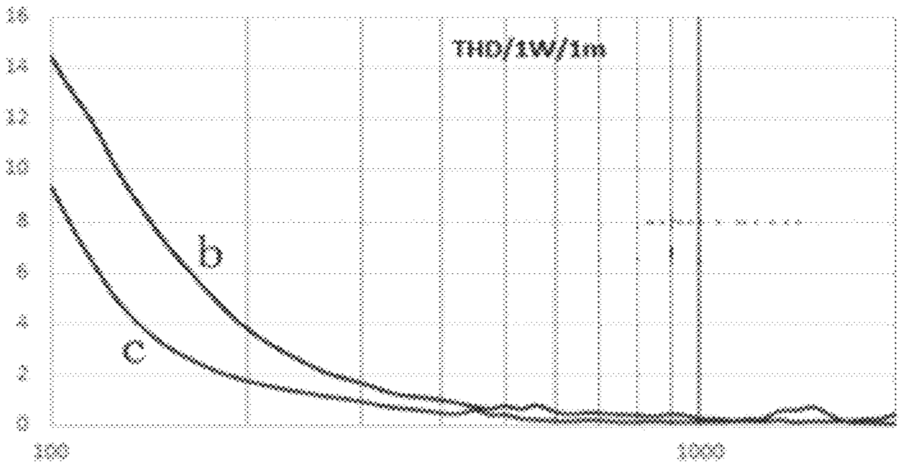

Distortion Curve Diagram of Sound-Producing Devices b: A Sound-producing Device Installed with a Prior Art Damper
c: A Sound-producing Device Installed with the Damper of the Present Disclosure

FIG. 4

SOUND-PRODUCING DEVICE AND ELECTRONIC TERMINAL

CROSS-REFERENCE TO RELATED APPLICATION

This application is a National Stage of International Application No. PCT/CN2020/126815, filed on Nov. 5, 2020 which claims priority to Chinese Patent Application No. 201911090401.X, filed on Nov. 8, 2019, both of which are hereby incorporated by reference in its entirety.

TECHNICAL FIELD

The present disclosure relates to the technical field of electro-acoustic conversion, and particularly to a sound-producing device and an electronic terminal.

BACKGROUND

A speaker is a basic sound-producing unit that converts electrical signals into acoustic signals. A damper is an assembly in the speaker that adjusts the vibration direction of a vibration diaphragm, and functions to suppress the polarization of the vibration diaphragm through the mechanical restoring force, so its function is relatively single. In an ordinary speaker, a voice coil wire is connected to a terminal via a lead wire so as to input an electrical signal to the voice coil.

In the trend of miniaturization of speaker products, the lead wire of the voice coil is one of the main factors that prevent the volume of the speaker products from being reduced, because the lead wire of the voice coil needs to vibrate together with the voice coil during the operation of the speaker and thus needs to be provided with a certain space for the vibration thereof if it is necessary to maintain the wiring of the lead wire. In this case, the miniaturization of the speaker products is limited.

In addition, even in a speaker equipped with damper, the diaphragm cannot avoid the polarization phenomenon, which has a great influence on the sound performance of the speaker.

Therefore, it is necessary to improve the structure of the damper and the connection method between the damper and the voice coil, so as to simultaneously deal with the hindrance to the reduction of the speaker's volume, the energization of the voice coil and the polarization of the diaphragm.

SUMMARY

An object of the present disclosure is to provide a sound-producing device for dealing with the polarization of the diaphragm of the existing speaker and the problems caused by using the lead wire to perform energization.

A sound-producing device, comprising:

a voice coil, the voice coil including a bobbin and a voice coil body wound outside the bobbin; the voice coil body is configured to be able to be input an electrical signal;

a first damper group and a second damper group, each of the first damper group and the second damper group comprising a first connecting part connected with the voice coil, a second connecting part fixed to the sound-producing device and an elastic part connected between the first connecting part and the second connecting part;

the first damper group is configured to be in electrical communication with the voice coil to input the electrical signal to the voice coil;

the first damper group and the second damper group are fixed to the voice coil in parallel at different heights.

Optionally, the first damper group is connected to the voice coil body, and the second damper group is connected to the bobbin.

Optionally, the first damper group is provided on a side of the voice coil body close to an end surface of the voice coil body; or, the first damper group is provided on an end surface of the voice coil body.

Optionally, the first damper group is connected to the bobbin, and the second damper group is connected to the voice coil body.

Optionally, the bobbin or the voice coil body is provided with a conducting member for electrically conducting with the first damper group.

Optionally, the conducting member is a pad, the first damper group and the pad are welded and fixed, and the second damper group and the bobbin or the voice coil body are fixed by glue.

Optionally, the pad is provided with a bending structure protruding from a side of the voice coil, and the bending structure is configured to hold the first damper group in position.

Optionally, the damper group is of a separate structure and includes at least two dampers; the damper includes the first connecting part, the second connecting part and the elastic part connected between the first connecting part and the second connecting part.

Optionally, the first damper group and the second damper group each include four dampers which are evenly arranged along a circumference of the voice coil.

Optionally, first connecting parts of two adjacent dampers in the damper group are connected to each other to form a first connection bridge, and first connecting parts of the other two dampers are connected to each other to form a second connection bridge; the damper group is connected to the voice coil via the first connection bridge and the second connection bridge.

Optionally, the second connecting part is in a hook structure, the sound-producing device is provided with a hanger column therein, and the hook structure is sleeved on the hanger column.

Optionally, the sound-producing device further includes a magnetic conductive part in which a magnet is provided, the voice coil is provided in the magnetic conductive part and is subjected to the magnetic field of the magnet; the magnetic conductive part is provided with an avoidance slot, and after the first damper group is connected with the voice coil body, the first damper group passes through the avoidance slot and is fixed on the sound-producing device.

Optionally, the elastic part is in a planar structure and is formed by integrally winding a metal wire.

Optionally, the sound-producing device has a resonant frequency F0 of 50 Hz to 300 Hz.

Optionally, the sound-producing device has a total harmonic distortion THD of less than 10% in a frequency range of 100 Hz to 300 Hz.

Optionally, the sound-producing device is a round sound-producing device or a square sound-producing device.

Optionally, the sound-producing device is a large bass or mid-range sound-producing device.

An electronic terminal comprises the above sound-producing device.

Optionally, the electronic terminal is a car audio or a speaker.

The beneficial effects of the technical solution of the present disclosure are: by setting the first damper group in the sound-producing device, it is possible to input electrical signals to the voice coil; by setting the second damper group, it is possible to realize the function of adjusting the vibration of the voice coil.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

FIG. 3 is an impedance curve diagram of a sound-producing device according to an embodiment of the present disclosure and a conventional sound-producing device;

FIG. 4 is a distortion curve diagram of a sound-producing device according to an embodiment of the present disclosure and a conventional sound-producing device;

Figure 1:
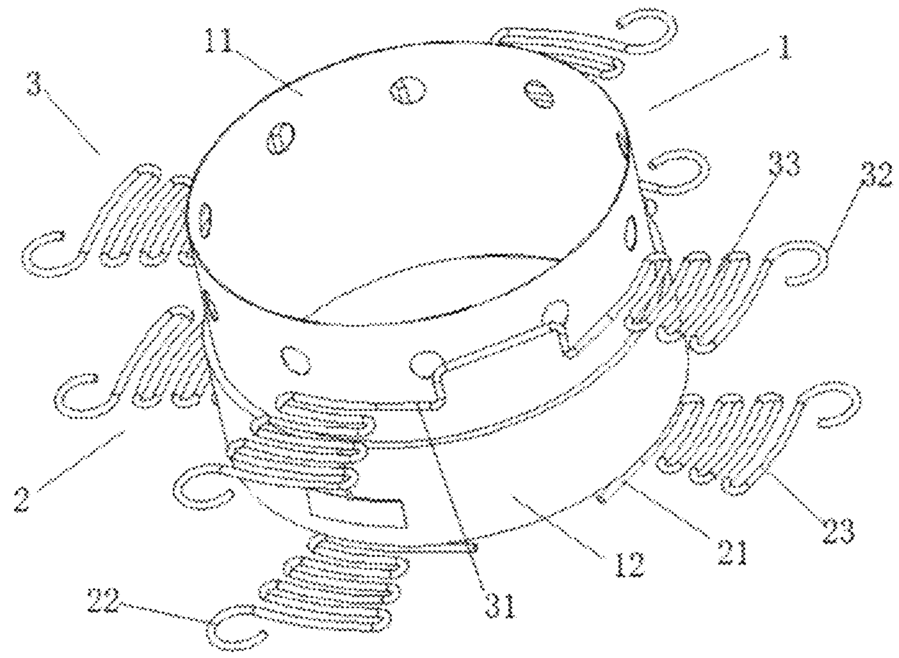
FIG. 1 is an installation diagram of a first damper group and a second damper group according to an embodiment of the present disclosure.
Figure 2:
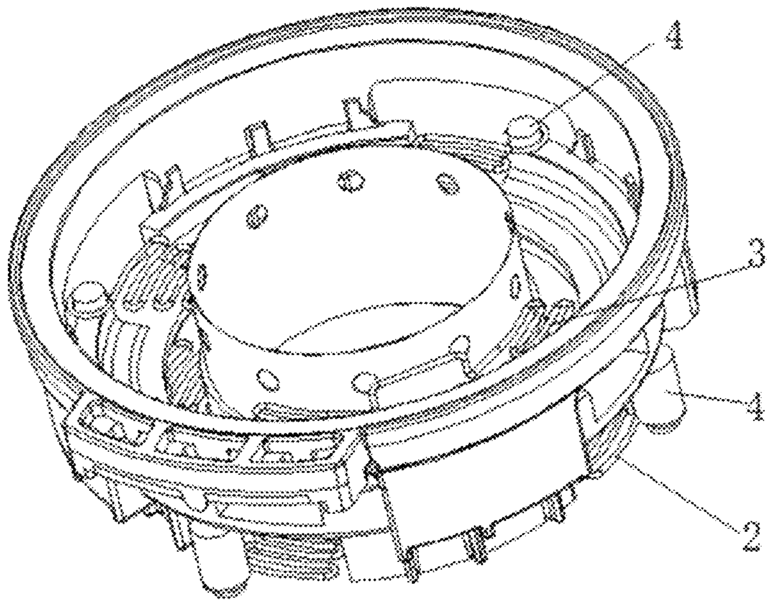
FIG. 2 is a schematic structural diagram of a sound-producing device after two damper groups are installed according to an embodiment of the present disclosure.

The figures are marked as follows: 1—voice coil; 11—bobbin; 12—voice coil body; 2—first damper group; 21—first connecting part; 22—second connecting part; 23—elastic part; 3—second damper group; 31—first connecting part; 32—second connecting part; 33—elastic part; 4—hanger column.

DETAILED DESCRIPTION

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

A conventional damper is in a loop shape which is radially arranged in a corrugated configuration, and is typically made of conex, blends, cloth, and the like. When the voice coil has a large amplitude, the damper has poor compliance Cms, that is, the mechanical stiffness value Kms is large (Kms and Cms are reciprocal to each other), and the compliance is poor in symmetry. This results in a larger resonance frequency F0 of the speaker, which will cause poor bass sensitivity for speaker products. This reduces the acoustic performance of the speaker and greatly affects the user's experience.

Ordinary speaker uses a lead wire to input the electrical signal to the voice coil, while the lead wire needs a certain space for vibration. In the trend of miniaturization of speaker products, reducing the size of the speaker will impair the acoustic performance of the speaker. Based on this, the present disclosure proposes a sound-producing device.

A sound-producing device, comprises:

- a voice coil, the voice coil including a bobbin and a voice coil body wound outside the bobbin; the voice coil is configured to be able to be input an electrical signal;
- a first damper group and a second damper group, each of the first the damper group and the second damper group comprising a first connecting part connected with the voice coil, a second connecting part fixed to the sound-producing device and an elastic part connected between the first connecting part and the second connecting part;
- the first damper group is configured to be in electrical communication with the voice coil to input the electrical signal to the voice coil;
- the first damper group and the second damper group are fixed to the voice coil in parallel at different heights.

As shown in FIG. 1, as an embodiment of the present disclosure, the above sound-producing device comprises a voice coil 1. Said voice coil is a composite structure comprising a round tube-shaped bobbin 11 and a voice coil body 12 wound outside of the bobbin. Said bobbin provides support for the voice coil body, and the voice coil body can be a coil capable of being input an electrical signal. The sound-producing device also includes a magnetic circuit system in which the voice coil is provided and is subjected to the magnetic force of a magnetic field. When the voice coil is input an electrical signal, it vibrates under the magnetic field, thereby driving the vibration diaphragm connected with it to vibrate. The vibration diaphragm vibrates to cause the air particles around it to move, thereby producing sound.

The sound-producing device also includes first damper group 2 and second damper group 3. The first damper group has a first connecting part 21 connected with the voice coil, a second connecting part 22 fixed to the sound-producing device, and an elastic part 23 connected between the first connecting part and the second connecting part; similarly, the second damper group 3 has a first connecting part 31 connected with the voice coil, a second connecting part 32 fixed to the sound-producing device, and an elastic part 33 connected between the first connecting part and the second connecting part. Among the two damper groups, the first damper group is used to input electrical signals into the voice coil, so that the voice coil vibrates under the action of the magnetic force of the magnetic field. The first damper group and the second damper group are connected to different heights of the tubular voice coil. Optionally, the first damper group is connected to the bobbin, and the second damper group is connected to the voice coil body, so that the two groups of damper groups are staggered in the height direction of the voice coil, thereby forming two groups of damper groups with different functions.

Optionally, the first damper group is connected to the voice coil body, and the second damper group is connected to the bobbin. As an embodiment of the present disclosure, an external lead is drawn from the voice coil body and connected to the first damper group, so that the first damper group and the voice coil are electrically connected. Specifically, the external lead of the voice coil body is connected to the first connecting part of the first damper group.

Optionally, the first damper group is provided on a side of the voice coil body close to an end surface of the voice coil body; or, the first damper group is provided on an end surface of the voice coil body. In this structure, when winding the voice coil body, a wire end of the coil may be reserved on the end face of the voice coil body or the side close to the end face. In this way, the first damper group may be directly connected to the wire end of the coil, thereby avoiding the need for separately providing a wire for electrically connecting the first damper group to the voice coil body. At the same time, it is possible to avoid that the wire end of the voice coil body is routed on the side of the voice coil, thereby reducing the complexity of winding the voice coil body.

Optionally, the first damper group is connected to the bobbin, and the second damper group is connected to the voice coil body. At this time, a lead may extend from the voice coil body to the installation position on the bobbin corresponding to the first damper group, so that the voice coil body and the first damper group are electrically connected.

Optionally, the bobbin or the voice coil body is provided with a conducting member for electrically conducting with the first damper group. The conducting member may be used to achieve the electrical connection between the first damper group and the voice coil body.

Optionally, the conducting member is a pad, the first damper group and the pad are welded and fixed, and the second damper group and the bobbin or the voice coil body are fixed by glue. Specifically, the first connecting part of the first damper group and the pad are welded and fixed to form the electrical connection, while the lead extending from the voice coil body is welded and fixed to the pad. In this way, electrical communication between the first damper group and the voice coil body is formed. Optionally, the second damper group is fixed to the bobbin or voice coil body through the first connecting part. Optionally, an adhesive may be used to bond and fix the second damper group to the bobbin or the voice coil body. The fixing method is simple to operate and has a good fixing effect.

Optionally, the pad is provided with a bending structure protruding from the side of the voice coil body, and the bending structure is configured to hold the first damper group in position. The bending structure may have a slot which is snapped on the first connecting part of the first damper group, and the first connecting part when used is snapped in the slot to realize the connection of the first connecting part and the pad. As another embodiment, the bending structure may be a snap ring whose axis is parallel to the side of the voice coil, and the first connecting part when being used passes through the snap ring to achieve a fixed connection with the pad. A bending structure for positioning the first damper group is arranged on the pad, which realizes the dual functions of positioning and conduction of the pad at the same time. In addition, by using the bending structure for positioning, it has the advantages of simple structure and reliable position holding.

Optionally, the damper group is of a separate structure and includes at least two dampers; the damper includes the first connecting part, the second connecting part and the elastic part connected between the first connecting part and the second connecting part. When the damper group includes two dampers, as a preferred embodiment, when the two dampers are arranged along the circumference of the voice coil, their connecting line passes through the center of the voice coil. At this time, the two dampers have a good centering effect on the voice coil, and at the same time have a good adjustment effect on the polarization of the voice coil. Optionally, the damper group may further include three dampers which are evenly arranged along the circumference of the voice coil to form a stable support for the voice coil. Optionally, the first damper group and the second damper group have different numbers of dampers. The first damper group mainly functions to transmit electrical signals to the voice coil, and the second damper group functions to center and adjust the vibration. As an optional embodiment, the number of dampers in the first damper group is less than the number of dampers in the second damper group. This setting method can not only realize the respective functions of the two damper groups, but also reduce the structural complexity in the sound-producing device and reduce the cost of the damper.

Optionally, the first damper group and the second damper group each include four dampers which are evenly arranged along a circumference of the voice coil.

Optionally, first connecting parts of two adjacent dampers in the damper group are connected to each other to form a first connection bridge, and first connecting parts of the other two dampers are connected to each other to form a second connection bridge; optionally, the connecting bridge is an arc-shaped structure or a convex-shaped structure. After the damper group is installed, the arc-shaped structure or the convex-shaped structure fits the side of the voice coil and occupies a certain radian in the circumferential direction of the voice coil. Optionally, the central angle corresponding to the radian may be 30° or 60°. This structure is beneficial for the damper group to support the voice coil more stably. The damper group is connected to the voice coil via the first connection bridge and the second connecting bridge. The connecting bridges may be bonded and fixed to the side of the voice coil through glue, or a pad may be provided on the side of the voice coil, and may be welded and fixed to the connecting bridges.

Optionally, the second connecting part of the damper is in a hook structure, the sound-producing device is provided with a hanger column therein, and the hook structure is sleeved on the hanger column. When being used, the damper is fixed to the hanger column via the hook structure. The connection between the damper and the sound-producing device implemented in this way may simplify the installation process of the damper. Alternatively, the sound-producing device is provided with a hanging loop, and the hook structure may also be hooked on the hanging loop in the sound-producing device, which is not limited by the present disclosure. Optionally, the number of bending turns of the hook structure may be one or at least two, and when the number of bending turns of the hook structure is at least two, the orthographic projections of the at least two turns of the hook structure in the vertical direction overlap. By increasing the number of turns of the hook structure, it may be beneficial to stably fix the damper on the sound-producing device.

Optionally, the sound-producing device further includes a magnetic conductive part in which a magnet is provided, the voice coil is provided in the magnetic conductive part and is subjected to the magnetic field of the magnet; the magnetic conductive part is provided with an avoidance slot, and after the damper is connected with the voice coil body, the damper passes through the avoidance slot and is fixed on the sound-producing device. Optionally, the magnetic conductive part is U iron, and when the damper is installed at the root position of the voice coil body or close to the root position of the voice coil body, the damper may interfere with the U iron. Therefore, it is necessary to open an avoidance slot on the magnetic conductive part corresponding to the installation position of the damper. At this time, after the damper is connected to the voice coil body, it passes through the opened avoidance slot, and then is connected to the sound-producing device. Optionally, the sound-producing device includes a casing on which the hanger column is provided, and the damper is connected to the hanger column of the casing after passing through the avoidance slot.

Optionally, the damper is a planar structure and is formed by integrally winding a metal wire. As an embodiment, the elastic part is a planar structure formed by bending and winding a metal wire, and the planar structure has multiple bending structures, similar to a planar spring structure. The metal planar spring structure has good compliance and can be used as a damper for the sound-producing device to adjust the vibration of the voice coil, and the sound-producing device at this time has good acoustic performance. In addition, the metal material has good fatigue performance, and during the working process of the sound-producing device, it is easy to destroy fatigue, and it is able to effectively prolong the service life of the sound-producing device. In addition, a damper with the planar structure can be used to energize the voice coil, replacing the existing lead wire. The planar structure can reduce the installation space inside the sound-producing device, reduce the overall height of the sound-producing device, and make the sound-producing device tend to be miniaturized.

Optionally, the sound-producing device has a resonant frequency F0 of 50 Hz to 300 Hz. The resonant frequency F0 is an important parameter that affects the low-frequency performance of the sound-producing device, and its calculation formula is as follows:

$$F0=1/2\pi\sqrt{Kms/Mms}$$

Wherein: F0—resonant frequency;

π—pi;

Kms—mechanical stiffness;

Mms—equivalent mass.

It can be seen from the above formula that Kms and Mms are two factors that affect F0. The smaller the Kms, the smaller the resonant frequency F0, and the better the acoustic performance of the sound-producing device. The larger the Mms, the smaller the resonant frequency F0. Under the existing technical conditions, in order to obtain a small mechanical stiffness, it is inevitable that high demands are placed on the material properties, which will undoubtedly increase the manufacturing cost of the sound-producing device. On the other hand, if the resonant frequency F0 is reduced by increasing the equivalent mass of the sound-producing device, it not only violates the principle of making the product lightweight, but also adversely affects other performances of the sound-producing device. Therefore, the present disclosure limits the resonant frequency F0 to the range of 50 Hz to 300 Hz, so the sound-producing device can obtain good low-frequency acoustic performance, and at the same time, it is possible to balance the relationship between the product manufacturing cost and other performance of the sound-producing device and the low-frequency acoustic performance.

According to an embodiment of the present disclosure, the impedance of the sound-producing device (curve b) using the prior art damper and that of the sound-producing device (curve c) using the above-mentioned damper are tested, and the results are shown in FIG. 3. As can be seen from the figure, in the case of using the traditional damper, the detected resonant frequency F0 of the sound-producing device is about 195 Hz, while in the case of using the above-mentioned damper to replace the prior art damper, the detected resonant frequency F0 of the sound-producing device is about 170 Hz. It can be seen from the test results that by using the damper as the damper of the sound-producing device, it is possible to significantly reduce the resonant frequency F0 of the sound-producing device, improve the bass sensitivity, and thus improve the acoustic performance of the sound-producing device.

The total harmonic distortion THD is a parameter reflecting the sound reproduction degree of the sound-producing device. The larger the value is, the more serious the sound distortion of the sound-producing device is, and the worse the listening effect of the sound-producing device is. Therefore, a sound-producing device is required to have a small total harmonic distortion THD in order to obtain a good hearing. According to an embodiment of the present disclosure, the total harmonic distortion THD of the sound-producing device (curve b) using the prior art damper and that of the sound-producing device (curve c) using the above-mentioned damper are detected, and the results are shown in FIG. 4. It can be seen from the figure that when the frequency band is lower than 1000 Hz, the detected total harmonic distortion THD of the sound-producing device using the traditional damper is significantly higher than that of the sound-producing device using the above-mentioned damper. Moreover, the lower the frequency band, the greater the difference between the two, and the more obvious the improvement effect on the total harmonic distortion THD of the sound-producing device. Therefore, by using the damper of the present disclosure as the damper of the sound-producing device, it is possible to significantly improve the sound reproduction degree and improve the listening effect of the sound-producing device.

Optionally, the total harmonic distortion THD of the sound-producing device is less than 10% within a frequency band of 100 Hz to 300 Hz. By limiting the total harmonic distortion THD of the sound-producing device to less than 10% in the above frequency range, it is possible to ensure that the sound-producing device has less sound distortion and the user can obtain a better listening effect. Preferably, when the frequency band is 200 Hz, the total harmonic distortion THD of the sound-producing device is limited to less than 2.5%. Preferably, when the frequency band is 300 Hz, the total harmonic distortion THD of the sound-producing device is limited to less than 2%.

As an embodiment of the present disclosure, the first damper group can replace the traditional lead wire for inputting electrical signals to the voice coil. On the one hand, the first damper group can play the role of centering, and on the other hand, it can also play the role of transmitting current, which is beneficial to reducing the volume of the sound-producing device. The second damper group plays the role of centering of the voice coil and adjusting the vibration of the voice coil. By adding the second damper group on the basis of the first damper group, it is possible to realize the functions of conducting electricity, adjusting vibration, and stabilizing centering at the same time, which has an important contribution to the miniaturization of the sound-producing device and can significantly improve the acoustic performance of the sound-producing device.

It should be noted that, in this embodiment, only a circular sound-producing device is taken as an example for description, however, in specific applications, this technical solution can also be applied to a square sound-producing device; of course, it can also be applied to devices of other shapes, which does not limit the invention.

Optionally, the sound-producing device is a large bass or mid-range sound-producing device. The sound-producing device can be installed in the speaker. The number of the sound-producing devices may be set to two; or, one of the two is set as a sound-producing device and the other is set as a tweeter, which is not limited by the present disclosure. In another embodiment, the sound-producing device described above may be used as an on-board speaker. The sound-producing device described above may also be used in other devices, which is not limited in the present disclosure.

As an embodiment of the present disclosure, the present disclosure also provides an electronic terminal, including the above sound-producing device. The electronic terminal may be a car audio or a speaker.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. A sound-producing device, comprising:

a voice coil including a bobbin and a voice coil body wound outside the bobbin; configured for input of an electrical signal;

a first damper group and a second damper group, each of the first damper group and the second damper group comprising a first connecting part connected with the voice coil, a second connecting part fixed to the sound-producing device and an elastic part connected between the first connecting part and the second connecting part;

wherein the first damper group is configured for electrical communication with the voice coil to input the electrical signal to the voice coil;

wherein the first damper group and the second damper group are fixed to the voice coil in parallel at different heights;

wherein the bobbin or the voice coil body is provided with a conducting member for electrically conducting with the first damper group;

wherein the conducting member is a pad, the first damper group and the pad are welded and fixed, and the second damper group and the bobbin or the voice coil body are fixed by glue; and wherein the pad is provided with a bending structure protruding from a side of the voice coil and configured to hold the first damper group in a position.

2. The sound-producing device of claim 1, wherein the first damper group is connected to the voice coil body, and the second damper group is connected to the bobbin.

3. The sound-producing device of claim 2, wherein the first damper group is selected from the group consisting of a damper group provided on a side of the voice coil body proximate to an end surface of the voice coil body and a damper group provided on an end surface of the voice coil body.

4. The sound-producing device of claim 1, wherein the first damper group is connected to the bobbin, and the second damper group is connected to the voice coil body.

5. The sound-producing device of claim 1, wherein the damper group is a separate structure and includes at least two dampers.

6. The sound-producing device of claim 5, wherein the first damper group and the second damper group each include four dampers which are evenly arranged along a circumference of the voice coil.

7. The sound-producing device of claim 6, wherein first connecting parts of two adjacent dampers in each of the first damper group and the second damper group are connected to each other to form a first connection bridge, and first connecting parts of the other two dampers are connected to each other to form a second connection bridge; the damper group is connected to the voice coil via the first connection bridge and the second connection bridge.

8. The sound-producing device of claim 1, wherein the second connecting part is in a hook structure, the sound-producing device is provided with a hanger column therein, and the hook structure is sleeved on the hanger column.

9. The sound-producing device of claim 3, wherein the sound-producing device further includes a magnetic conductive part in which a magnet is provided, the voice coil is provided in the magnetic conductive part and is subjected to the magnetic field of the magnet; the magnetic conductive part is provided with an avoidance slot, and the first damper group passes through the avoidance slot and is fixed on the sound-producing device.

10. The sound-producing device of claim 1, wherein the elastic part is in a planar structure and is formed by integrally winding a metal wire.

11. The sound-producing device of claim 1, wherein the sound-producing device has a resonant frequency F0 of 50 Hz to 300 Hz.

12. The sound-producing device of claim 1, wherein the sound-producing device has a total harmonic distortion THD of less than 10% in a frequency range of 100 Hz to 300 Hz.

13. The sound-producing device of claim 1, wherein the sound-producing device is a round sound-producing device or a square sound-producing device.

14. The sound-producing device of claim 1, wherein the sound-producing device is a large bass or mid-range sound-producing device.

15. An electronic terminal, comprising the sound-producing device of claim 1.

16. The electronic terminal of claim 15, wherein the electronic terminal is a car audio or a speaker.

* * * * *